(12) United States Patent
Rolfsmeier et al.

(10) Patent No.: US 9,971,321 B2
(45) Date of Patent: May 15, 2018

(54) METHOD FOR INFLUENCING A CONTROL PROGRAM (71) Applicant: dSPACE digital signal processing and control engineering GmbH, Paderborn (DE)

(72) Inventors: Andre Rolfsmeier, Bad Lippspringe (DE); Thorsten Hufnagel, Salzkotten (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 538 days.

(21) Appl. No.: 14/672,836

(22) Filed: Mar. 30, 2015

(65) Prior Publication Data
US 2015/0277408 A1 Oct. 1, 2015

(30) Foreign Application Priority Data

Mar. 28, 2014 (EP) ..................................... 14162207

(51) Int. Cl.
*G05B 15/02* (2006.01)
*G05B 19/042* (2006.01)
(52) U.S. Cl.
CPC .......... *G05B 15/02* (2013.01); *G05B 19/0426* (2013.01)
(58) Field of Classification Search
CPC .............................. G05B 15/02; G05B 19/0426
(Continued)

(56) References Cited

U.S. PATENT DOCUMENTS 6,550,052 B1 * 4/2003 Joyce ........................ G06F 8/20
700/113
7,752,559 B1 * 7/2010 Szpak ........................ G06F 8/10
715/735
(Continued)

FOREIGN PATENT DOCUMENTS

CN 1577268 2/2005
CN 101223522 A 7/2008
(Continued)

OTHER PUBLICATIONS

European Search Report for European Application No. 14162207.6 dated Oct. 30, 2014 with English translation.
(Continued)

*Primary Examiner* — Ryan D. Coyer
(74) *Attorney, Agent, or Firm* — Muncy, Geissler, Olds & Lowe, P.C.

(57) ABSTRACT

A method for influencing a control program of a control unit, the control program having a plurality of first functions configured for controlling an actuator. The program code of the control program is examined for the occurrence of function calls, and the branch addresses and return addresses connected with the function calls, and the variables connected with the applicable first functions, are ascertained with the names of the variables and with the applicable memory addresses. The ascertained first functions and variables assigned to the applicable first functions are stored with the connected memory addresses in a first mapping table, and from a comparison of the first mapping table with a second predefined mapping table, function names are assigned to at least a portion of the first functions, and at least one first value of one of the variables is replaced by a second value.

16 Claims, 3 Drawing Sheets

(58) Field of Classification Search
USPC .......................................................... 700/86
See application file for complete search history.

(56) References Cited

U.S. PATENT DOCUMENTS

| | | | |
|---|---|---|---|
| 8,397,219 | B2 | 3/2013 | Vick et al. |
| 8,645,918 | B2 | 2/2014 | Leinfellner et al. |
| 2004/0205740 | A1* | 10/2004 | Lavery .................. G06F 8/4441 717/151 |
| 2005/0010911 | A1 | 1/2005 | Kim et al. |
| 2005/0209988 | A1 | 9/2005 | Cunningham et al. |
| 2010/0192122 | A1* | 7/2010 | Esfahan ............. G05B 19/0426 717/105 |
| 2010/0250870 | A1 | 9/2010 | Vick et al. |
| 2010/0274755 | A1 | 10/2010 | Stewart |
| 2010/0287536 | A1 | 11/2010 | Chung et al. |
| 2011/0029946 | A1 | 2/2011 | Joukov et al. |
| 2013/0041550 | A1 | 2/2013 | Dressler et al. |
| 2013/0042079 | A1 | 2/2013 | Dressler et al. |

FOREIGN PATENT DOCUMENTS

| | | |
|---|---|---|
| CN | 102955875 A | 3/2013 |
| CN | 103106145 A | 5/2013 |
| DE | 10 2004 027 033 A1 | 10/2005 |
| EP | 1 205 842 A2 | 5/2002 |
| JP | 2000-284958 A | 10/2000 |
| JP | 2002-259121 A | 9/2002 |
| JP | 2012-525648 A | 10/2012 |
| WO | WO 2012/052924 A1 | 4/2012 |

OTHER PUBLICATIONS

Japanese Office Action for Japanese Application No. 2015-065615 dated Mar. 31, 2016 with English translation.
Chinese Office Action dated May 7, 2017 with an English Translation.

* cited by examiner

STP ⸺
```
/beginFUNCTIONengine_idle_rev
    /beginIN_MEASUREMENT
        var4
        var13
        var2
    /endIN_MEASUREMENT /beginOUT_MEASUREMENT
        var8
        var2
        var14
        var11
        var22
    /endOUT_MEASUREMENT /beginDEF_CHARACTERISTIC
        rcp_n_3568
        scri_896
        elec_m_csw
    /endDEF_CHARACTERISTIC
/endFUNCTION
```

Fig. 4

METHOD FOR INFLUENCING A CONTROL PROGRAM

This nonprovisional application claims priority under 35 U.S.C. § 119(a) to European Patent Application No. EP14162207.6, which was filed on Mar. 28, 2014, and which is herein incorporated by reference.

BACKGROUND OF THE INVENTION

Field of the Invention

The present invention relates to a method for influencing a control program.

Description of the Background Art

A method for influencing a control unit is known from the document DE 10 2004 027 033 A1, which corresponds to U.S. Pat. No. 8,645,918, which is incorporated herein by reference.

Electronic control units are used for control tasks in numerous complex, technical systems, in particular in motor vehicles. It is a matter of course that a control unit program, hereinafter called control program, usually has a plurality of subroutines, with a typical control program using 10,000 and more control unit variables. By means of the control programs implemented in the control units, actuators such as, e.g., injection nozzles or electric steering systems, are controlled, values are read from sensors such as, e.g., rate of rotation sensors, acceleration sensors, mass airflow sensors, and exhaust gas probes, and the values are evaluated and processed. On account of the potentially safety-critical applications for many control units, very stringent demands are placed on the reliability and freedom from defects of the control program. Accordingly, development is resource-intensive and is carried out with a plurality of test series. It is desirable in this context to change functions of the control program, or at least variables of functions of the control program, at a stage as early as the development and redevelopment or continued development, or testing, of the control units. For this purpose, specific service functions, for example, are known from the conventional art that are configured to deactivate a first function of the control program and replace it with a second, subsequently implemented function, for instance, in that variables written by the first function are subsequently overwritten with the output values of the second function. The calls to the service function can be inserted into the program code either early on, during development of the control program at the so-called source code level, or they are inserted subsequently, after completion of the control program.

Oftentimes, the source code of the control program is not available to function developers and test engineers who wish to make a change to the control program as described above, and who to this end wish to insert a call to a service function, for example, into the control program code after the fact. However, as a general rule, the binary code is available, for example in the form of a hex or srec file, together with the associated control unit description file, for example in the form of an ASAP2 file, for calibration, measurement, and flash programming of the control units. Changing functions of the control program, as described in the previous paragraph, must then be carried out using the binary code of the control program. The developer entrusted with this task is then faced with the problem of identifying the functions to be changed in the binary code. An analysis of the binary code, also referred to as parsing, does indeed make it possible to recognize function calls and the associated memory addresses as such, but the calls cannot readily be assigned to specific functions. In other words: By means of parsing it is possible to determine that a function is stored at a specific memory address, but not which function of the control program is stored there.

SUMMARY OF THE INVENTION

It is therefore an object of the present invention to provide a method that advances the conventional art.

According to an embodiment of the invention, a method is provided for influencing a control program present in the form of binary program code for a control unit, wherein the control program has a plurality of first functions and subroutines assigned to the first functions, in particular wherein one of the first functions is configured for controlling an actuator, and the control unit has a first memory for accommodating the control program, wherein a branch address is present in the program code of the control program at the call to one of the first functions, and the branch address points to a memory address of the first function connected to the function call, and the called first function or the subroutine assigned to it is present as a sequence of binary program code, and a return instruction with a return address assigned to the return instruction is present at the end of the sequence of program code, and wherein the sequence of program code of the called first function contains a first number of variable accesses, i.e., write and/or read accesses to variables, and a memory address is assigned to each variable access, and wherein a first value is assigned to at least one variable, wherein the control program is examined for the occurrence of function calls, and the addresses of the function calls are ascertained, and the program code of the first functions is examined for variable accesses, and the addresses of the variables that are read and written and that are connected with the applicable first functions are ascertained, and the ascertained first functions and the variable addresses assigned to the applicable first functions are stored, along with the branch addresses connected with the first function calls, in a first mapping table, and from a comparison of the first mapping table with a predefined, second mapping table, function names are assigned to at least a portion of the first functions, and at least one first value of one of the variables is replaced by a second value. According to the invention, the predefined, second mapping table contains at least one assignment of variables of the control program to their memory addresses, and an assignment of functions of the control program to the variables that are accessed from within an applicable function.

It should be noted that the branch addresses connected with the first functions are additionally stored in the first mapping table. It should further be noted that in the present case, the term "influence" can be equated to the term "modify." Moreover, in the present case, modifying the program can also be understood to mean, in particular, modifying at least one variable, in particular a variable that influences the functioning of an actuator. According to an embodiment of the invention, the modification of a variable can take place through a direct access of the memory address assigned to the variable. The modification of a variable can, according to the invention, also take place through modification of a description specification in the code of the control program, in particular in such a manner that the function that contains the description specification for the variable is deactivated and replaced by a different function with a different description specification for the variable. The modification of a variable can, according to an embodiment of the invention, also take place in that a write access to the variable in the code of the control program is deactivated.

An advantage of the method according to the invention is that the control program of a control unit can be modified or influenced in a simple way with no knowledge of the program code and/or of the source code. In particular, the method according to the invention makes it possible to identify, and subsequently to modify or to replace, predefined functions in the binary code of the control program. To this end, the method according to the present invention can be used, for example, to ascertain which function names, along with the variables assigned to the function names, are associated with which branch addresses of function calls found in the binary code of the control program.

In particular, even control programs of control units that have already been installed can be influenced subsequently. The existing interfaces can be used for this purpose, in particular with the help of an influencing device provided to that end, such as a dSPACE DCI-GSI2. Another advantage is that, as a result of identification of the first functions present in the program, in many cases knowledge of the program code or the availability of complete documentation of the first functions is not necessary. In particular, when the basic functionality of a certain function as well as the variables written and read out by this function are known, it is possible to deactivate the function by means of a method known in the prior art as function bypassing and to replace the function with a different function with similar functionality, provided that the memory address of the function to be replaced in the binary code of the control program is known. By means of the method, the first functions in the binary code or their addresses and the addresses of the variables read and written in them are ascertained and stored in a first mapping table. Function names can be assigned to the memory addresses of the called first functions from the comparison with a predefined, second mapping table.

In an embodiment, during examination of the program code of the control program, an assigned read access and an assigned write access can be ascertained for the relevant variable and are stored in the first mapping table. In the comparison of the first mapping table with the second, predefined mapping table, the match of the read accesses and write accesses assigned to the variable is examined. It is advantageous here to display the degree of the match via a display unit.

In another embodiment, one function name and a certain number of variables can be assigned to each first function in the second mapping table, wherein each variable has a name and a memory address, and in the comparison, function names are assigned for the first functions stored in the first mapping table as a function of the degree of match, at least with regard to the number and names of the variables stored in both mapping tables under the relevant first function, and the degree of match is displayed. An assignment of the function names can be carried out, for example, automatically only for a complete match or only for a match exceeding a threshold value.

In an embodiment, in the case of an incomplete match with regard to the number and names of the variables between the first mapping table and the second mapping table, a manual assignment of the function name can be carried out instead of an automatic assignment. For this purpose, the ascertained first functions with the number and names of the variables can be displayed in a comparative manner together with the number and names of found variables listed in the second mapping table, for example. A parameter characterizing the degree of match for each first function can also be displayed on the same display unit, for example in the form of a percentage match.

In an embodiment of the invention, a heuristic can be employed when no function name with the identical number and names of variables can be found for a function call encountered in the control program. It is advantageous to communicate the function name with the greatest match to the user. In another embodiment, a notification can be issued and the degree of match is communicated when no complete match is present. A heuristic of this type is advantageous because the content of the first and second mapping tables can differ in practice, particularly such that variables or function calls assigned to functions are occasionally assigned incorrectly, or assigned variables or function calls are not documented in some cases or were overlooked in the analysis of the binary code.

In an embodiment, output only takes place when the degree of match exceeds a predefinable threshold value during the comparison. Stated in different terms, first functions are only displayed in the display unit when the degree of match of the number and names of variables in the comparison of the two mapping tables exceeds the threshold value. The threshold value can be at least 50%, most preferably at least 80%.

In another embodiment, a message can be output via the influencing device when no complete match is ascertained during comparison of the two mapping tables for any of the first functions in the examination of the control program.

In another embodiment, a function can be automatically assigned a function name only when the degree of match in the comparison exceeds a threshold value. In an embodiment, a function can be automatically assigned a function name in the precise case when the degree of match in the comparison exceeds a predefined or predefinable threshold value. In another embodiment, a function is automatically assigned a function name in the precise case when the degree of match in the comparison exceeds a first threshold value and at the same time the degree of match for the next-best-matching function name falls below a second threshold value. In another embodiment, a function is automatically assigned a function name in the precise case when the degree of match in the comparison exceeds a predefined or predefinable first threshold value and at the same time the difference between the degree of match for the function and the degree of match for the next-best-matching function exceeds a predefined or predefinable second threshold value.

In another, the result can be verified with the aid of a cross-check. To this end, before the assignment of a function name to a function, a comparison of the function name with all other functions of the control program is carried out and a degree of match is ascertained pursuant to the method according to the invention, and an automatic assignment of the function name to the function is carried out only if the degree of match in the comparison does not exceed a predefined or predefinable threshold value for any of the other functions.

In an embodiment of the invention, the second mapping table further contains an assignment of first functions to other first functions called from a relevant first function, particularly such that the second mapping table assigns at least a portion of the first functions of the control program to a function tree, which in turn lists functions called from the called functions, and so on. If at least a portion of the functions directly or indirectly called from the first function has already been identified with the aid of the method according to the invention, an as-yet unidentified function call can be assigned to a function tree in the first mapping table in this way, and a comparison can be carried out with one or more function trees entered in the second mapping table. This comparison can be used as a further criterion for identification of the function call in addition to the comparison in accordance with the invention of variable accesses assigned to the function call. In particular, in this embodiment even functions that contain no variable accesses because their code is composed entirely of function calls are accessible to the method.

In embodiment, one of the first functions can be selected and the function call of the selected first function is deactivated and/or the first function is replaced with a second function via a modeling system. In particular, via the modeling system and the influencing device, the program code of one or more of the selected first functions can be overwritten by the program code of one or more of the second functions.

In an embodiment, the modeling system can have a second memory unit, wherein the second function is stored in the second memory unit and, in the case of the first function that is to be replaced by the second function, at least the variable accesses are deactivated and/or the variables are subsequently overwritten.

The second mapping table can be implemented in the form of, for example, an ASAP2 file (also referred to as an ASAM MCD-2 MC or A2L file). It should be noted that the ASAP2 format is a standardized format in the automotive field for the technical description of control programs. In particular, ASAP2 files can contain a listing of variables with assigned memory addresses, an assignment of variables to the individual functions, and an assignment of a tree of function calls to the individual functions.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
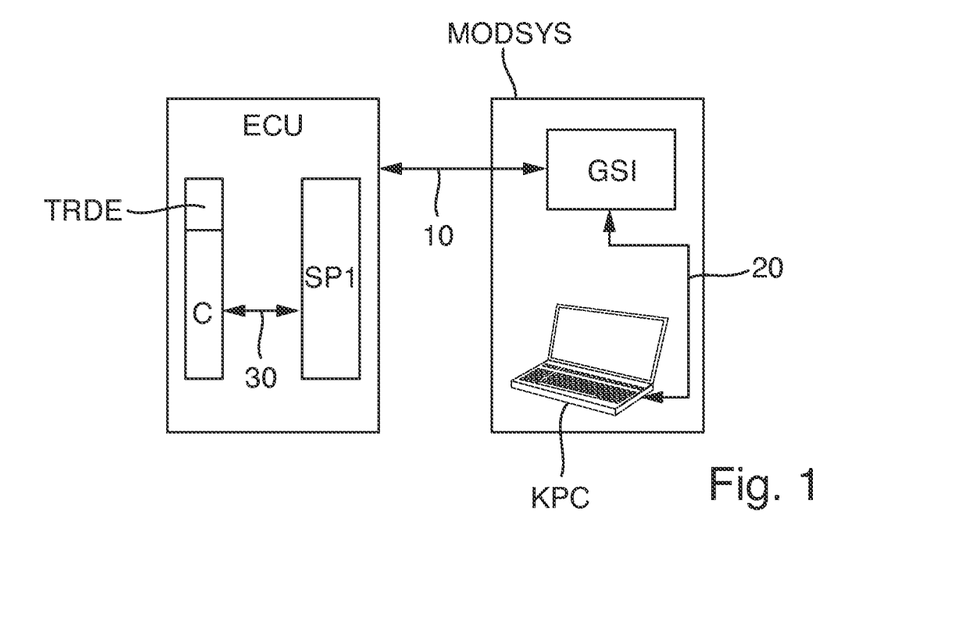
FIG. 1 shows a view of an arrangement for influencing a control program of a control unit.
Figure 2:
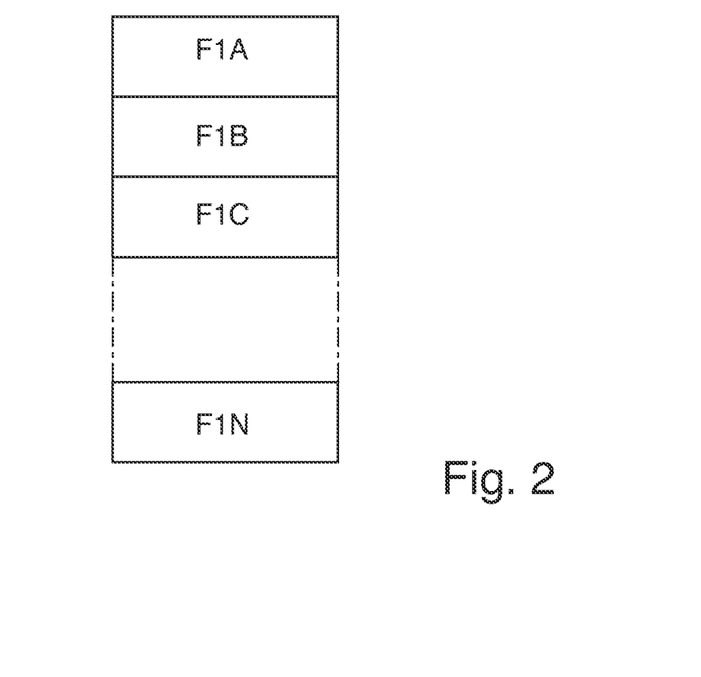
FIG. 2 shows a highly simplified view of the structure of the control program stored in a first memory.

The diagram in FIG. 1 shows a view of an arrangement for influencing a control program STP, depicted in FIG. 2, of a control unit ECU. The control unit ECU has a first memory SP1 and a processor C with an interface TRDE connected to the processor. The control unit ECU is connected by a line 10 to a modeling system MODSYS, wherein the modeling system MODSYS is implemented outside the control unit ECU. The modeling system MODSYS includes a display unit KPC and an influencing device GSI. The display unit KPC is connected to the influencing device GSI via a line 20. It is a matter of course that the control program STP exists as binary code or as hex code.

The diagram in FIG. 2 shows the structure of the control program STP stored in the memory SP1. The control program STP has a plurality of first functions F1A, F1B, F1C, ... F1N. It should be noted that the first functions F1A, F1B, F1C, ... F1N are generally present in the form of subroutines.

Figure 3:
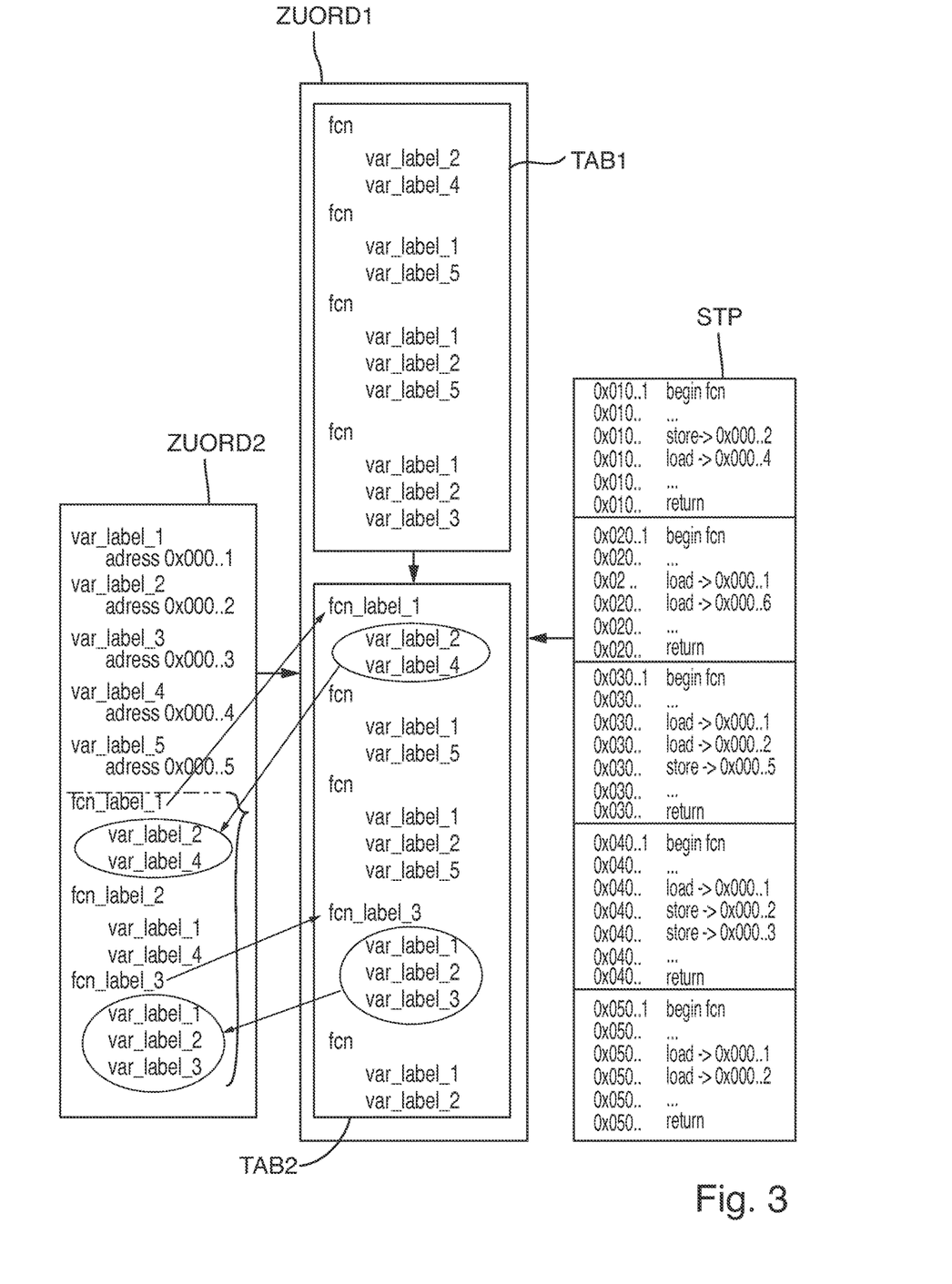
FIG. 3 shows a detailed view of the control program and an embodiment of the method according to the invention.

The illustration in FIG. 3 shows a detailed view of the structure of the control program STP and an embodiment of the method according to the invention. The control program STP includes the plurality of subroutines and the first functions F1A, F1B, F1C, ... F1N assigned to the subroutines, collectively labeled fcn in the drawing. Each of the first functions F1A, F1B, F1C, ... F1N begins with a first instruction and has a return instruction "return" at the end of the respective first function F1A, F1B, F1C, ... F1N. It is a matter of course in this regard that during the processing or execution of the control program STP a branch address is present at a call to each first function F1A, F1B, F1C, ... F1N, and the branch address points to a memory address of the subroutine connected to the function call. A first instruction begin fcn is stored at the memory address to which the branch instruction points. The subroutines are present as a sequence of binary program code. The return instruction return is present at the end of the sequence of the program code of each subroutine, with a return address assigned to the return instruction.

Moreover, the subroutines and the depicted first functions F1A, F1B, F1C, ... F1N each have a first number of variable accesses. In the present case, two types of variable accesses are shown here: the write instructions store, which cause a write access, and the read instructions load, which cause a read access; in other words, a memory address is associated with each variable access. The write instructions store and the read instructions load thus point to specific memory addresses of the memory SP1. Consequently, the values of the variables are written into specific memory cells or read from specific memory cells with the write instructions store and the read instructions load.

Also shown are a first mapping table ZUORD1, with a first table TAB1 and a second table TAB2, and a second mapping table ZUORD2. The tables TAB1 and TAB2 represent two different states in processing the first mapping table ZUORD1. The first table TAB1 represents a state of mapping table ZUORD1 after the completion of one method step, and the second table TAB2 represents the completed first mapping table ZUORD1 after the completion of another, later method step. The second mapping table ZUORD2 is a predefined table and contains, in particular, a listing of the variables of the control program STP with associated memory addresses and an assignment of the variables to the individual functions of the control program STP. In one advantageous embodiment, it is implemented in the form of a control unit description file, in particular in the form of an ASAP2 file. The results of the examination of the control program STP are stored in the first mapping table ZUORD1 and compared to the contents of the second mapping table ZUORD2.

In a first method step, the program code of the control program STP is examined for the occurrence of function calls, and the branch addresses and return addresses connected to the function calls as well as the variables connected to the respective first functions F1A, F1B, F1C, . . . F1N are ascertained along with the relevant memory addresses of the variables. To this end, an ascertained function call has assigned to it all variable accesses that take place in the sequence of the control program after the function call but before the return instruction assigned to the function call. The result of such an analysis, also referred to as program parsing by individuals skilled in the art, is a description of the control program STP as shown in FIG. 3. In the ideal case, which is to say after an error-free analysis has been performed, it contains a listing of all first functions F1A, F1B, F1C, . . . F1N of the control program STP with the associated function addresses in each case (i.e., the memory address of the first program instruction associated with the relevant function), the memory address of the associated return instruction for each function, and a listing of the write and read instructions on variables performed within the function together with the relevant memory addresses of the variables.

In a second method step, the memory addresses of the variables are assigned to the names of the variables through a first comparison with the second mapping table ZUORD2, and the results of this first comparison are entered into the first mapping table ZUORD1. The result is the preliminary mapping table TAB1, which assigns a variable signature to each of the program functions, not yet identified at this time.

In an embodiment of the method, during examination of the program code a specific function has assigned to it not only the variable accesses that take place directly from the function, but also those that take place from subfunctions of the function, wherein both stated types of variable accesses, those that take place from the specific function and those that take place from an arbitrary subfunction of the specific function, are entered on an equal basis in the preliminary mapping table TAB1. According to the invention, a subfunction of a given function is understood to mean a function of the control program that is called directly from the given function or indirectly from the given function using a sequence of function calls. This embodiment of the method can be advantageous. In particular, when the given second mapping table ZUORD2 is constituted such that it assigns variable accesses from subfunctions to a given function, the assignment in the first mapping table ZUORD1 must be carried out in a corresponding manner for the method to function reliably.

In a third method step, the variable signatures of at least a portion of the functions from the first table TAB1 are compared with the function descriptions in the second table ZUORD2, and in this way a function name is assigned to each of at least a portion of the first functions F1A, F1B, F1C, . . . F1N, in each case preferably the name of the function with the greatest match with the variable signature. By way of example, in the figure two function names, fcn_label_1 and fcn_label_3, are assigned to their associated first functions using their variable signatures. The result is the completed mapping table TAB2. The names and memory addresses of all functions to which a function name is assigned are henceforth known to the user, which puts the user in a position to make changes to these functions.

In a fourth method step that is not shown, at least the first value of one of the variables is replaced by a second value, for example in such a manner that a function F1X, which is configured for controlling an actuator, is assigned a function name and the function F1X is deactivated using the address information obtained in this manner and is replaced by a second function F2X, wherein F2X is configured for controlling the same actuator, but contains a different specification from F1X for describing a variable that influences the behavior of the actuator through its value.

Figure 4:
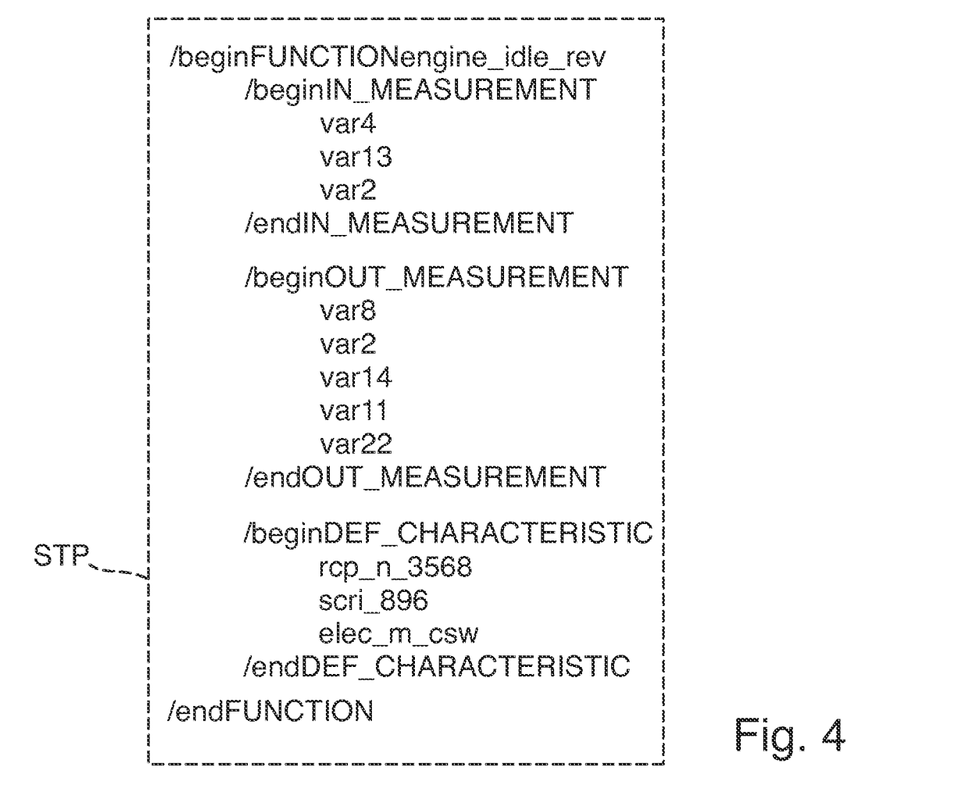
FIG. 4 shows a detailed view of the description of a subroutine in the ASAP2 format.

The illustration in FIG. 4 shows a detailed view of the exemplary description of a subroutine "engine_idle_rev" in conformity with the ASAP2 format. The first line of the description block lists the function name that is connected to the subroutine. The first sub-block IN_MEASUREMENT contains a listing of all variables read in by the subroutine, the second sub-block OUT_MEASUREMENT contains a listing of all variables written by the subroutine. Not shown in the figure, but also contained in the ASAP2 file, is an assignment of all variables to their relevant memory addresses. In an advantageous embodiment, this information, which can be read from the ASAP2 file, forms the basis for the second mapping table ZUORD2.

The ASAP2 file can also contain, for every program function described, a listing of all functions called from the function, in particular in the form of a function tree. If the addresses of at least a portion of these functions have already been identified, they can be used in an advantageous embodiment of the method as a further criterion for identification of a function. To this end, for every function found in the program code, the function calls made from the relevant function with the associated function addresses are also entered in the preliminary mapping table TAB1. Following the identification according to the third method step of the functions found in the program code, function names are assigned to the function calls in a fourth method step through a comparison with the table TAB2, and the results are stored in a table TAB3.

Hence, TAB3 assigns to all identified functions in the program code a signature of function calls, which can be compared in a fifth method step with the corresponding function descriptions in ZUORD2. In an advantageous embodiment, the results of this last comparison are used to verify the correctness of the results of the assignment from the third method step. In another advantageous embodiment, the results of this last comparison are used to assign function names to functions that contain no variable accesses. In a sixth method step, at least the first value of one of the variables, in particular a variable that influences the behavior of an actuator, is replaced by a second value.

The ASAP2 file can contain additional information not required for the method according to the invention, for example, as shown in the illustration of FIG. 4, a sub-block DEF_CHARACTERISTIC with a listing of calibration parameters declared by the subroutine. It is advantageous to separately collect read and write accesses to variables in the first mapping table ZUORD1 and the data direction of variable usage (read or write, or IN_MEASUREMENT and OUT_MEASUREMENT) in the second mapping table ZUORD2, because this increases the probability of a high match in the third method step.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for influencing a control program of a control unit, the control program having a plurality of first functions and subroutines assigned to the first functions, at least one of the first functions is configured for controlling an actuator, the control unit having a first memory for accommodating the control program, the control program being a binary program code, wherein a branch address is present in the program code of the control program at a call to one of the first functions, the branch address pointing to a memory address of the first function connected to the function call, the first function being a sequence of binary program code, and a return instruction with a return address assigned to the return instruction is present at an end of the sequence of program code of the subroutine, and a sequence of program code of the first function contains a first number of variable accesses, a memory address being assigned to each variable access, and a name and a first value being assigned to at least one variable, the method comprising:

examining the program code of the control program;
examining the branch addresses connected with the function calls contained in the program code of the control program;
ascertaining the variables connected with the respective first functions with respective memory addresses of the variables;
storing the ascertained first functions and the variable addresses assigned to the respective first functions with the connected memory addresses in a first mapping table;
assigning, based on a comparison of the first mapping table with a second predefined mapping table, function names to at least a portion of the first functions; and
replacing at least one first value of one of the variables by a second value.

2. The method according to claim 1, wherein, during examination of the program code of the control program, an assigned read access or an assigned write access is ascertained for each ascertained variable and is stored in the first mapping table, and wherein, in the comparison, the match of the read accesses and write accesses assigned to the variable is examined.

3. The method according to claim 1, wherein the second mapping table assigns a function name and a number of variables to each of least a portion of the first functions, and wherein the second mapping table also assigns a memory address to each of the variables.

4. The method according to claim 1, wherein, in the comparison, function names are assigned for the first functions stored in the first mapping table as a function of the degree of match, at least with respect to the number and addresses of the variables stored in both mapping tables under the respective first function.

5. The method according to claim 4, wherein the assignment of the function names is carried out automatically only for a complete match.

6. The method according to claim 4, wherein, prior to the assignment of a function name to one of the first functions in the first mapping table, a manual assignment is carried out if a degree of match in the comparison is below a threshold value.

7. The method according to claim 4, wherein an automatic assignment is carried out only if the degree of match in the comparison exceeds a threshold value or wherein an automatic assignment is carried out only if the degree of match in the comparison exceeds a first threshold value and a degree of match for a next-best-matching function falls below a second threshold value.

8. The method according to claim 5, wherein a message is output via a modeling system when a degree of match does not meet or exceed a threshold value for any of the first functions.

9. The method according to claim 1, wherein, via a modeling system one of the first functions that was assigned a function name is selected, and wherein a function call of the selected first function is deactivated or the first function is replaced by a second function.

10. The method according to claim 1, wherein the second mapping table is implemented in the form of an Engine Control Unit (ECU) Measurement and Calibration Data Exchange Format (ASAP2) file.

11. The method according to claim 1, wherein the program code of the control program is examined for the occurrence of function calls.

12. The method according to claim 1, wherein a given first function has assigned to it all variables that are accessed in the sequence of the control program after the call to the given first function but before execution of the return instruction assigned to the given first function.

13. The method according to claim 1, wherein a given first function has assigned to it all variables that are accessed in the sequence of the control program after the call to the given first function but before execution of the return instruction assigned to the given first function and that are not accessed from a subfunction of the given first function.

14. The method according to claim 1, wherein a first value of a variable whose value influences the behavior of an actuator is replaced by a second value.

15. The method according to claim 1, wherein, in the second mapping table, at least a portion of the first functions is assigned a number of function calls, wherein each assigned function call represents a subfunction called from the relevant first function, wherein, during the examination of the control program, calls to subfunctions taking place from a first function are ascertained together with the respective function addresses and at least a portion of the ascertained called subfunctions are assigned function names, wherein the ascertained calls to subfunctions are stored with the assigned function names in the first mapping table, and wherein at least one additional first function is assigned a function name or at least one assignment of a function name that has already been carried out is tested for correctness based on a comparison with assigned function names in the second mapping table.

16. A method for influencing a control program of a control unit, the control program having a plurality of first functions and subroutines assigned to the first functions, the control unit having a first memory for accommodating the control program, the control program being a binary program code, wherein a branch address is present in the program code of the control program at a call to one of the first functions, the branch address pointing to a memory address of the first function connected to the function call, the first function being a sequence of binary program code, and a return instruction with a return address assigned to the return instruction is present at an end of the sequence of program code of the subroutine, and a sequence of program code of the first function contains a first number of variable accesses, a memory address being assigned to each variable access, and a name and a first value being assigned to at least one variable, the method comprising:

examining the program code of the control program;
examining the branch addresses connected with the function calls contained in the program code of the control program;
ascertaining the variables connected with the respective first functions with respective memory addresses of the variables;

storing the ascertained first functions and the variable addresses assigned to the respective first functions with the connected memory addresses in a first mapping table;
assigning, based on a comparison of the first mapping table with a second predefined mapping table, function names to at least a portion of the first functions; and
replacing at least one first value of one of the variables by a second value.

* * * * *